2,994,958
MEASURING TAPE
Allan R. A. Beeber, Elizabeth, N.J., assignor to Keuffel & Esser Company, Hoboken, N.J., a corporation of New Jersey
Filed Jan. 17, 1956, Ser. No. 559,643
12 Claims. (Cl. 33—137)

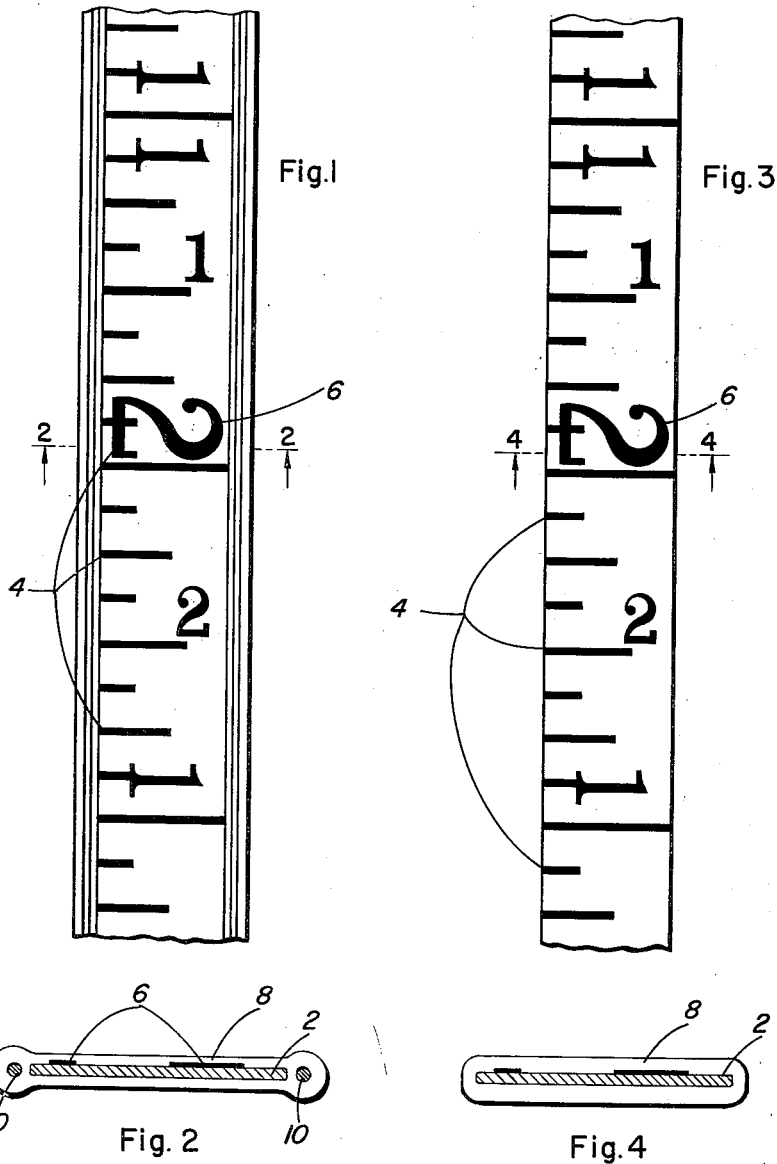
Aug. 8, 1961  A. R. A. BEEBER  2,994,958
MEASURING TAPE
Filed Jan. 17, 1956
INVENTOR.
ALLAN R.A. BEEBER
ATTORNEY United States Patent Office 2,994,958
Patented Aug. 8, 1961

This invention relates to measuring tapes. One type of measuring tape which is widely used is described in Patent No. 2,089,209 and consists of a steel strip covered with a white coating, graduations and indicia printed on the white coating and a top coating of transparent material. This type of tape is very legible but it has been found that the useful life of the tape depends almost entirely on the top coating. Once the top coating has been worn off, the printed graduations and indicia rapidly wear off and the tape is no longer usable.

Another type of measuring tape which is in wide use is the electroplated tape. In the electroplated tape, the background is usually an electroplated metal such as chromium which contrasts with black graduations which may be either printed directly on the steel strip or formed by chemically blackening the areas of the steel strip which form the graduations and indicia. The thickness of the electroplated material in these tapes is extremely thin so that the electroplated coating has very little wear resistance in itself and a top coating is also necessary in order to increase the durability of the tape. As a practical matter, the durability of the electroplated tapes is also almost wholly dependent upon the thickness and wear resistance on the top coat.

According to the present invention, the thickness of the transparent material covering the graduations and indicia has been increased far above anything possible using prior art measuring tape constructions. This is accomplished by printing the graduations and indicia on an extremely thin strip of sheet material which need not have any strength in itself. The imprinted thin strip of sheet material is then encapsulated in a relatively heavy sheet of transparent plastic material. By using an extrusion process to encapsulate the printed strip in the plastic material it is possible to make the thickness of the protective sheet of transparent plastic material much greater than was ever possible by using coating techniques for applying a transparent protective coating.

A typical prior art measuring tape according to Patent No. 2,089,209 might consist of a steel strip .008" thick coated on both sides with a pigmented base coating .0005" thick, imprinted on one side with indicia and graduations and top coated on both sides with a transparent coating of .0005" thickness or less. According to the present invention, the strip of thin sheet base material need have a thickness of no more than .002" or .003" and the extruded clear plastic material may have a thickness of as much as .003" to .004" on both sides of the strip. This is an increase in the thickness of the protective coating of from 6 to 8 times with a corresponding increase in durability.

Another advantage of the tape made according to the present invention is the fact that the extreme thinness of the base material makes it easier to handle in the printing operation so that simpler printing machinery as used for printing paper and the like may be used instead of the more complicated special machinery now used in the measuring tape industry. The extrusion process for encapsulating the thin strip is also a relatively simple process which can be performed economically on a production basis.

Another possibility in measuring tapes made according to the present invention is to include a wire or filament of dimensionally stable material within the encapsulated sheet of clear plastic material. For example, a steel wire can be included along each edge of a thin strip of printed material, the two pieces of steel wire and the thin strip all being encapsulated in the clear plastic material.

The drawings illustrate two embodiments of the present invention which achieve the objects of the invention set forth above. In the drawings:

FIG. 1 is a view in plan of a measuring tape in accord with one embodiment of the invention.

FIG. 2 is a view in sectional elevation taken along the line 2—2 of FIG. 1 and looking in the direction of the arrows.

FIG. 3 is a view in plan of a length of a measuring tape made according to another embodiment of the invention.

FIG. 4 is a view in sectional elevation taken along the line 4—4 of FIG. 3 and looking in the direction of the arrows.

In both embodiments shown in the drawings the extremely thin strip of sheet material 2 is imprinted with graduations 4 and indicia such as the numbers 6 and is covered by a heavy layer 8 of transparent plastic material.

In the embodiment of FIGS. 1 and 2, a filament 10 of dimensionally stable material such as a steel wire is included along each edge of the thin strip of sheet material 2 and is also encapsulated in the sheet of transparent plastic material 8. The embodiment of FIGS. 1 and 2 as shown in the drawing has a further advantage in that the edges of the tape are raised above the area where the graduations and indicia appear so that these raised edges act as a further protection against wear of the transparent plastic material which lies directly above the graduations and indicia. In this respect, the edges act similarly to the raised metal edges of a measuring tape made according to Patent No. 2,374,356 which issued to A. W. Keuffel and H. F. Schermerhorn on April 24, 1945.

If filaments 10 of metal wire such as copper are used they may also be used to carry an electric current in the surveying of wells and the like. In this application, the tape would be lowered into a well and when the surface of the water in the well was reached by the end of the tape, an electrical instrument at ground level would indiate that the circuit between the ends of the wire running along each edge of the tape had been completed.

The extremely thin strip of sheet material 2 may be an extremely thin strip of steel no more than .002 or .003 of an inch thick or thin strips of materials never before considered satisfactory for use in the measuring tape art such as paper, aluminum foil, plastic foils such as vinyl and polyethylene glycol terephthalate and the like. The sheet of transparent plastic material 8 may be of vinyl, nylon, polyesters such as polyethylene glycol terephthalate and the like. The filaments 10 of dimensionally stable material may be of metal wire such as steel, glass filaments or even stable plastic filaments such as some of the polyester filaments including polyethylene glycol terephthalate or other stable plastic filaments such as orientated saponified cellulose acetate filaments and also vinyl filaments and the like.

Having thus described the invention, what is claimed is:

1. A measuring tape comprising an extremely thin strip of sheet material which is of insufficient thickness to provide adequate structural strength for normal usage, said thin strip of sheet material having graduations and indicia marked thereon, said thin strip of sheet material with the graduations and indicia marked thereon being encapsulated in a relatively heavy layer of transparent plastic material of sufficient strength and stiffness to provide a tubular sheath around the strip and securely adhering to the peripheral portion of the strip to thereby provide a protective covering which produces a substantial portion of the strength in the normal usage of the measuring tape.

2. The invention according to claim 1 in which the encapsulation is at least .003 of an inch thick.

3. The invention according to claim 1 in which the strip of sheet material is approximately .003 of an inch thick and the encapsulation is approximately .003 of an inch thick.

4. The invention according to claim 1 in which the strip is steel.

5. The invention according to claim 1 in which the strip is aluminum.

6. The invention according to claim 1 in which the strip is vinyl plastic.

7. The invention according to claim 1 in which the strip is polyethylene terephthalate.

8. The invention according to claim 1 in which the strip is paper.

9. The invention according to claim 1 in which wire means are encapsulated with the strip.

10. The invention according to claim 9 in which the wire means is of electrically conductive material and the plastic sheath is of electrical insulating material.

11. The invention according to claim 1 in which the layer of transparent encapsulating material is selected from the group consisting of vinyl, nylon, and polyesters including polyethylene terephthalate.

12. A measuring tape comprising a strip of aluminum foil no more than .003" thick having graduations and indicia marked thereon encapsulated by extrusion in a heavy sheath of plastic material at least .003" thick.

References Cited in the file of this patent

UNITED STATES PATENTS

| | | |
|---|---|---|
| 2,050,941 | Farrand | Aug. 11, 1936 |
| 2,089,209 | Keuffel | Aug. 10, 1937 |
| 2,215,996 | Benton | Sept. 24, 1940 |
| 2,217,451 | Patnode | Oct. 8, 1940 |
| 2,257,104 | Burrows | Sept. 30, 1941 |
| 2,308,638 | Balthis | Jan. 19, 1943 |
| 2,524,829 | Perzel | Oct. 10, 1950 |
| 2,607,712 | Sturken | Aug. 19, 1952 |
| 2,659,153 | Beeber | Nov. 17, 1953 |

FOREIGN PATENTS

| | | |
|---|---|---|
| 571,855 | France | May 26, 1924 |
| 1,943 | England | 1897 |